Patented June 25, 1935

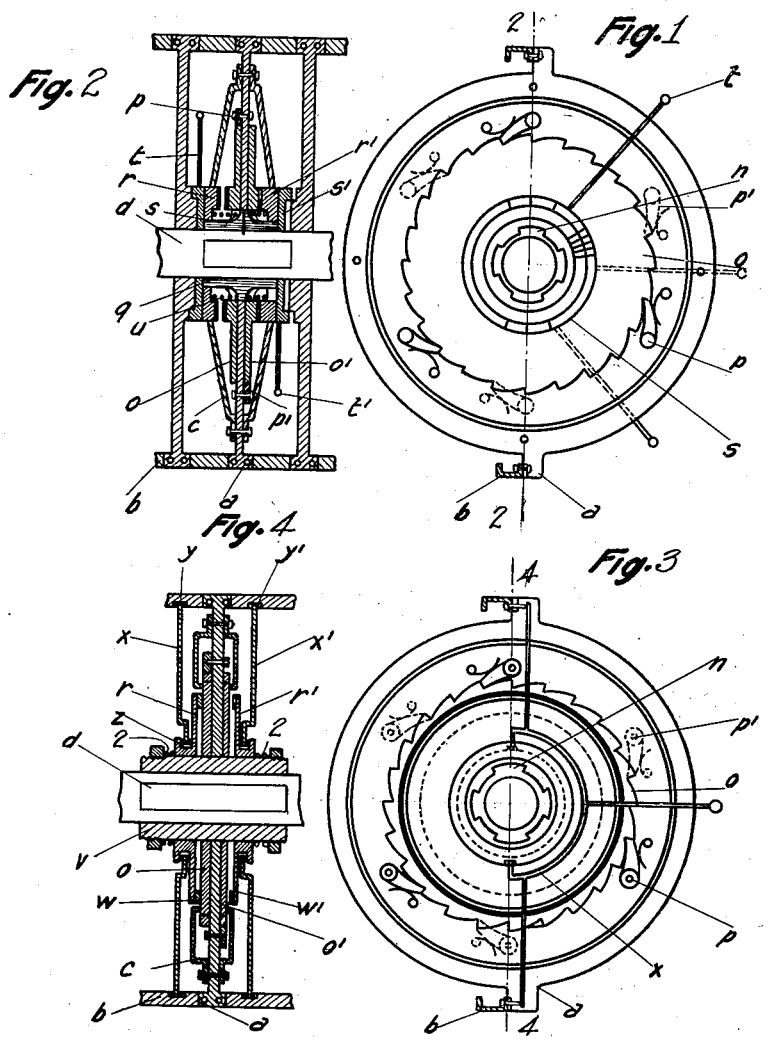

2,006,261

UNITED STATES PATENT OFFICE 2,006,261

RATCHET DEVICE FOR PREVENTING THE REARWARD MOTION OF POWER DRIVEN VEHICLES

Atille Catella, Paris, France

Application September 10, 1931, Serial No. 562,175
In France September 12, 1930

2 Claims. (Cl. 188—81)

When a vehicle, chiefly a motor vehicle, is caused to stop on a slope, there is always a danger, in case the brakes become loose, of the vehicle moving backwards under the action of its own weight whereby accidents may arise and damages may occur. Similarly when the vehicle is caused to start again, it is necessary at the start to put the brakes on and to submit thus the motor to an exaggerated strain without this having any useful driving action. Moreover there are numerous circumstances in the daily operation of a motor car which constrain the driver to take much care in order to prevent the vehicle from moving backwards down a slope.

My invention has for its object a device which completely removes these serious drawbacks and which reliably prevents the vehicle from running in the direction contrary to that corresponding to the position of the change speed gears without the different parts of the vehicle being submitted to any strain.

I accomplish this through a device comprising two ratchet wheels the teeth of which are cut respectively so as to allow rotation in opposite directions, and catches therefor, means being provided for causing either of the ratchet wheels, at will, to be operative, the other wheel being then inoperative.

In order that the invention and its mode of operation may be readily understood by those skilled in the art, I have in the accompanying drawing and in the detailed description based thereupon, set out possible embodiments of the same.

In the drawing:

Figure 1 is an elevation of one form of the invention;

Figure 2 is a section taken on line 2—2 of Figure 1;

Figure 3 is an elevation of a modified form of the invention; and,

Figure 4 is a section taken on line 4—4 of Figure 3.

Having more particular reference to the drawing, wherein like characters of reference will designate corresponding parts throughout, my improved device may be stated to comprise a frame $a$ secured to the frame $b$ of the vehicle by means of bolts or the like. $c$ designates the casing adapted to protect the different parts of the device and to contain fatty material required for lubrication and silent working, whereas $d$ designates the control shaft.

In Figs. 1 and 2, $q$ designates a sleeve driven by the control shaft $d$ and adapted to slide longitudinally thereon owing to the presence of the corrugations $n$. Loosely mounted upon the shaft $d$ over the sleeve $q$, is a pair of ratchet wheels $o$ and $o'$ having their teeth cut in opposite directions and adapted for cooperative engagement with two series of catches $p$ and $p'$ respectively. The sleeve $q$ carries at $r$ and $r^1$ two ring-shaped clutch elements adapted to engage respectively the two ratchet wheels according to the position of the sleeve with reference to the shaft. The sleeve $q$ is formed at its extremities with inclined surfaces (not shown) corresponding to similar surfaces upon a pair of ring-shaped parts $s$ and $s'$ bearing against the frame, whereby upon turning said parts a longitudinal displacement of the sleeve $q$ will be obtained. This operation of the parts $s$ and $s'$ is caused by the actuation of levers $t$ and $t'$ respectively connected to said parts. The springs $u$ serve to hold the clutch elements $r$ and $r^1$ apart. The clutch elements $r$ and $r'$ carried by the sleeve $q$ are provided with gear teeth capable of engagement with corresponding teeth on ratchet wheels $o$ and $o'$ so that by longitudinally displacing the sleeve $q$, engagement will be obtained either between the clutch element $r$ and the wheel $o$, or between the clutch element $r'$ and the wheel $o'$.

Figs. 3 and 4 show a possible modification in the execution of the connection between the part driven by the shaft $d$ and either of the ratchet wheels. Here again is provided a sliding sleeve $v$ carrying at $w$ and $w^1$ two friction linings of ferodo or the like material. Each of these linings is adapted when it comes into contact with the corresponding ratchet wheel, to drive it round with it. In this form of execution the control means $x$, $x^1$ pivoting round $y$, $y^1$ are interconnected and act inside grooves $z$, $z^1$ of the sleeve $v$ under the action of a boss or cam not shown. A suitably shaped casing $c$ is adapted to protect the different parts and to contain a lubricant. Springs 2 the compression of which is adjustable are also provided for keeping the friction clutches apart against the action of the control means.

It should be noted that in all the forms of execution which have been described, it is possible to obtain not only the alternating engagement of the ratchet wheels, but also their simultaneous disengagement either by bringing the control means into an intermediate position or else by using independent control means for the two ratchet wheels and actuating them separately.

What I claim is:

1. A device of the character described comprising a driving shaft, a pair of ratchets loosely carried by said shaft and each disposed in reverse relation to the other, pawls positioned for cooperative engagement with said ratchets, and clutch means operable to connect either of said ratchets to the shaft.

2. A device of the character described comprising a driving shaft, a pair of ratchets loosely carried by said shaft and each disposed in reverse relation to the other, pawls positioned for cooperative engagement with said ratchets, a sleeve keyed to said shaft but slidable thereon and interposed between the shaft and ratchets, and clutch elements fixed to said sleeve and movable therewith for engagement with either of the ratchets to selectively connect the same with the shaft.

ATILLE CATELLA.